United States Patent [19]

Smith

[11] Patent Number: 5,186,442
[45] Date of Patent: Feb. 16, 1993

[54] VISOR WITH DOUBLE ACTING SLIDE MECHANISM

[75] Inventor: Nels R. Smith, Holland, Mich.

[73] Assignee: Prince Corporation, Holland, Mich.

[21] Appl. No.: 827,417

[22] Filed: Jan. 28, 1992

[51] Int. Cl.$^5$ ............................................. B60J 3/02
[52] U.S. Cl. .................................. 296/97.8; 296/97.4
[58] Field of Search .......................... 296/97.8, 97.4; 160/370.2

[56] References Cited

U.S. PATENT DOCUMENTS

| | | | |
|---|---|---|---|
| Re. 24,706 | 9/1959 | McCormick | 296/97.8 |
| 2,289,644 | 7/1942 | Gano, Jr. | 296/97.8 |
| 2,444,524 | 7/1948 | Parrish, Jr. | 296/97.8 |
| 2,559,471 | 7/1951 | Schrock | 296/97.8 |
| 4,149,749 | 4/1979 | Canal | 296/97.8 |
| 4,491,360 | 1/1985 | Fleming | 296/97.8 |
| 4,492,404 | 1/1985 | Marcus et al. | 296/97.8 |
| 4,697,843 | 10/1987 | Tomforde | 296/97.4 |
| 4,844,530 | 7/1989 | Mahler et al. | 296/97.1 |
| 4,902,062 | 2/1990 | Pusic et al. | 296/97.4 |
| 4,904,013 | 2/1990 | Canadas | 296/97.4 |
| 4,929,014 | 5/1990 | Clark et al. | 296/97.8 |
| 4,979,775 | 12/1990 | Klose | 296/97.1 |
| 4,989,910 | 2/1991 | Mersman et al. | 296/97.4 |
| 5,000,506 | 3/1991 | Abu-Shumays et al. | 296/97.8 |
| 5,031,952 | 7/1991 | Miyamoto et al. | 296/97.4 |

FOREIGN PATENT DOCUMENTS 1102089  2/1968  United Kingdom .

Primary Examiner—Robert R. Song
Attorney, Agent, or Firm—Price, Heneveld, Cooper, DeWitt & Litton

[57] ABSTRACT

A slide-out visor includes a double acting slide mechanism which includes first and second slide members pivotally coupled to one another with the first slide member slidably mounted to a vehicle support member. The second slide member is slidably mounted to a visor panel such that the visor is extended by withdrawing the panel with the first and second slide members moving along guide means in the vehicle support member and visor panel respectively. In a preferred embodiment of the invention, each of the slide members include spring means which provide a controlled engaging surface between the slide members and the guide means formed in the vehicle support member and visor panel respectively. In a preferred embodiment of the invention, the spring means are metallic leaf springs and an overlying arm of polymeric material extends between the metal spring and the guide means to provide a lubricious polymeric interface for the slide members with respect to the supporting structure and the visor panel.

33 Claims, 3 Drawing Sheets

VISOR WITH DOUBLE ACTING SLIDE MECHANISM

BACKGROUND OF THE INVENTION

The present invention pertains to automotive visors and particularly to a slide mechanism for such a visor.

There is a variety of visors which extend outwardly from a storage position behind a vehicle headliner. Such construction is represented, for example, by U.S. Pat. Nos. 4,491,360; 4,492,404; and 4,989,910. In order to provide a smooth acting visor control for the movement of the visors from behind the headliner outwardly to a lowered use position, typically multiple pivot arms have been used or a synchronized rack and pinion guide mechanism to provide stable, smooth operation of the visor in its movement.

Sliding planar visors which extend in edge tracks and include stabilizing mechanisms are also known and are typified by U.S. Pat. No. 4,149,749. Such visors tend to bind or stick due in part to widely varying temperatures to which a visor positioned immediately adjacent the roof are subjected in the automotive environment. A visor which extends behind the headliner must be capable of withstanding 100 F. or greater temperature differentials during their operation and still present approximately the same general operational characteristics or "feel" to the user. It has been discovered that a simple sliding mechanism such as a rectangular visor panel captively held at opposite edges in tracks will not provide this desired visor control. Further, in order to provide the extension of a reasonable sized panel-shaped visor, the slide mechanism must have sufficient size and strength to support a relatively large visor panel. In compactly designed vehicles where windshields are severely angled, space in the headliner area is at a premium and prevents the use of large conventional slide mechanisms.

SUMMARY OF THE PRESENT INVENTION

In order to overcome the difficulties of providing an inexpensive, reliable and yet consistently performing slide-out visor, the double acting slide mechanism of the present invention includes first and second slide members pivotally coupled to one another with the first slide member slidably mounted to a vehicle support member. The second slide member is slidably mounted to a visor panel such that the visor is extended by withdrawing the panel with the first and second slide members moving along guide means in the vehicle support member and visor panel respectively.

In a preferred embodiment of the invention, each of the slide members include spring means which provide a controlled engaging surface between the slide members and the guide means formed in the vehicle support member and visor panel respectively. In a preferred embodiment of the invention, the spring means are metallic leaf springs and an overlying arm of polymeric material extends between the metal spring and the guide means to provide a lubricious polymeric interface for the slide members with respect to the supporting structure and the visor panel.

As a result of this construction, a slide-out visor mechanism is provided which is relatively inexpensive, reliable and provides a constant feel to the visor panel for a wide range of operating conditions including varying temperatures. This structure provides for the full extension of a visor panel with a minimal amount of space being required for its storage. These and other features, objects and advantages of the present invention will become apparent upon reading the following description thereof together with reference to the accompanying drawings in which:

DETAILED DESCRIPTION OF THE PREFERRED EMBODIMENT

Figure 1:
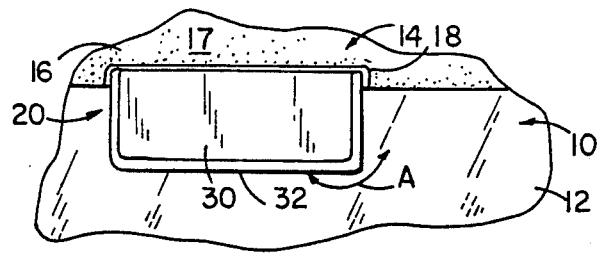
FIG. 1 is a perspective view of a vehicle including a visor assembly embodying the present invention.

Referring initially to FIG. 1, there is shown a section of a vehicle 10 incorporating a visor system 20 of the present invention. The vehicle includes a front windshield 12 and a roof 14 covered by a headliner panel 16 which includes a slot 18 adjacent the windshield for receiving the slide-out visor assembly 20 of the present invention. The headliner panel 16 can be made by molding a polymeric or other suitable material in current use in a three-dimensional shape conforming to that of the vehicle's roof and attaching it to the roof by any of a variety of well-known manners. Typically, there will be a space between the upper surface of the headliner which may be covered by a suitable upholstery material 17 on its exposed surface and the sheet metal roof structure of the vehicle to allow the visor assembly 20 to be fitted therebehind. Slot 18 may be finished in a variety of manners including by wrapping the upholstery fabric 17 around the edges of the slot, by a trim bezel, or by other suitable means.

Figure 2:
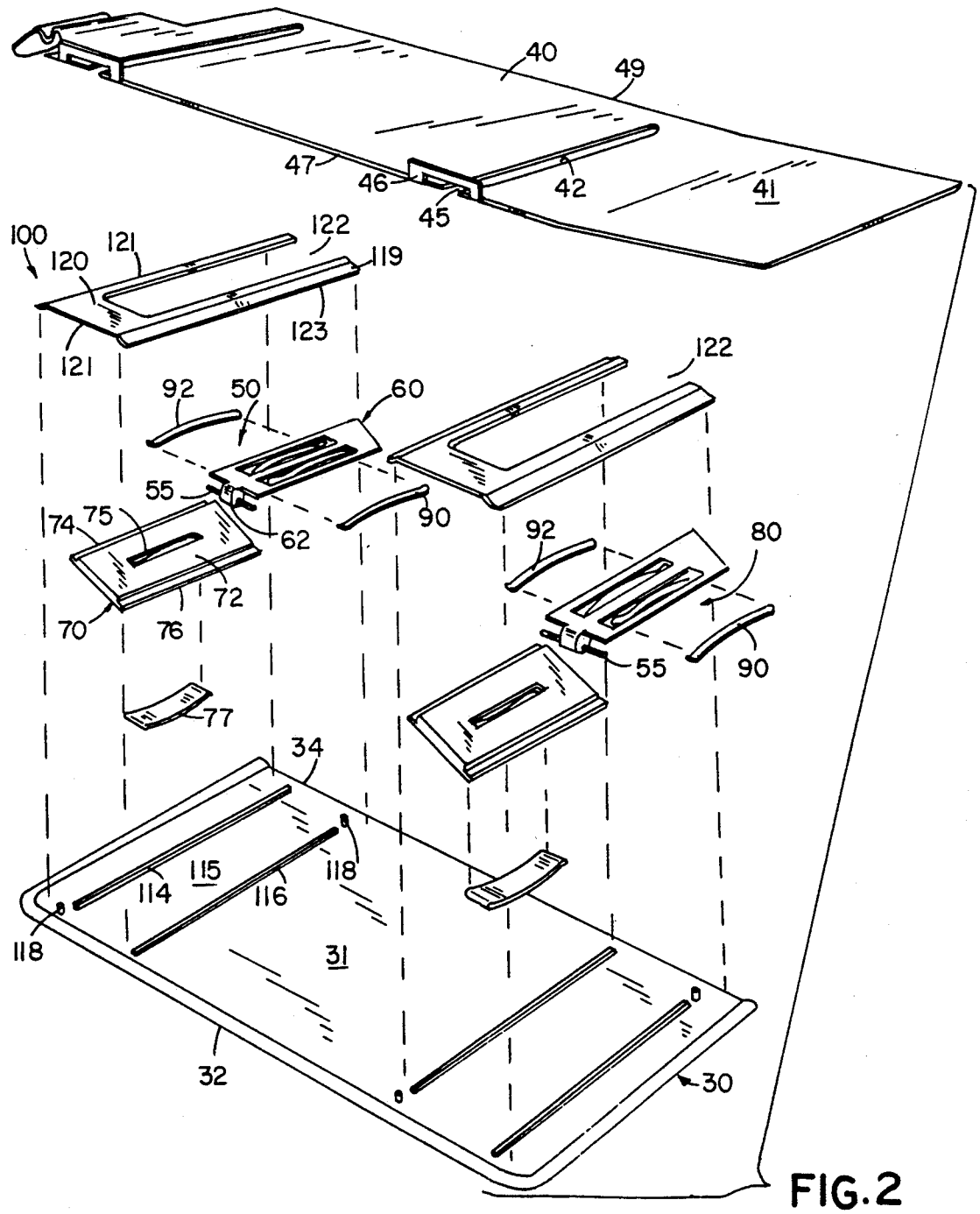
FIG. 2 is an enlarged exploded perspective view of a visor assembly embodying the present invention.
Figure 10:
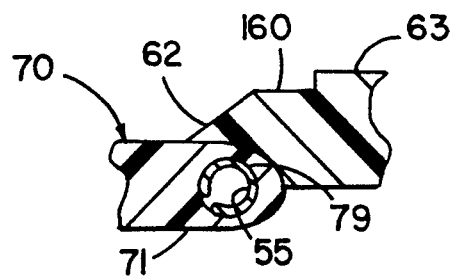
FIG. 10 is an enlarged fragmentary cross-sectional view taken along section lines X—X of FIG. 3.

The visor assembly 20, as seen in FIG. 2, includes a visor panel 30 which extends between a lowered use position shown in FIG. 1 and a position substantially retracted with the roof of the vehicle except for a forward lip 32 (FIG. 2) which extends a sufficient distance outwardly from slot 18 to allow it to be gripped and withdrawn from the headliner. Coupling the visor panel 30 to either the sheet metal roof structure of the vehicle or to the headliner is a support member 40. Member 40 may be integrally formed as part of the sheet metal roof structure of the vehicle or a separate member suitably attached to either the roof or the headliner. A pair of slide assemblies 50 and 80 pivotally and slidably couple panel 30 to support 40 with only slide assembly 50 being described in detail since the two slide assemblies are identical and are identically coupled to the respective support and panel. Each of the slide assemblies include a first generally trapezoidal-shaped slide member 60 which is slidably attached to the support member 40 in the vehicle roof area behind the headliner and a second generally trapezoidal-shaped slide member 70 which is slidably coupled to the visor panel 30. Members 60 and 70 are pivotally intercoupled to one another by means of a hinge including a central tang 62 extending from edge 61 of slide member 60 (FIGS. 3-5) and a corresponding pair of spaced aligned tangs 71 and 73 on slide member 70. A pivot pin comprising a spring loaded roll pin 55 (FIG. 10) which is a split cylinder made of spring steel couples members 60 and 70. Pin 55 extends through apertures 79 in tangs 71 and 73 and an aligned aperture in tang 62. The roll pin 55 serves as a hinge to allow panel 30 to pivot once the panel is extended from behind the headliner as shown in FIG. 1 in an arc indicated by Arrow A in FIG. 1 for its desired adjusted position either adjacent the windshield or rotated toward the vehicle operator or passenger. The roll pin 55 serves as a hinge but in addition, due to the compressive mounting of the roll pin within the apertures, it also provides a predetermined rotational torque for panel 30 such that it will remain in an adjusted position during use.

Figure 3:
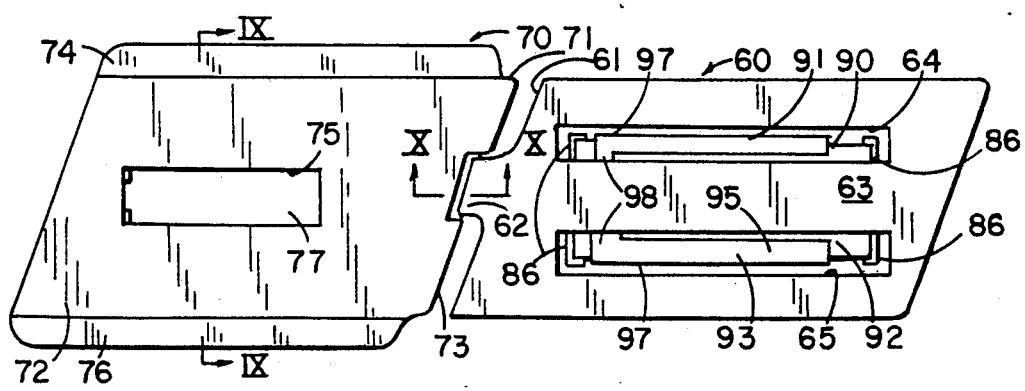
FIG. 3 is an enlarged top plan view of a slide assembly shown in FIG. 2.
Figure 4:
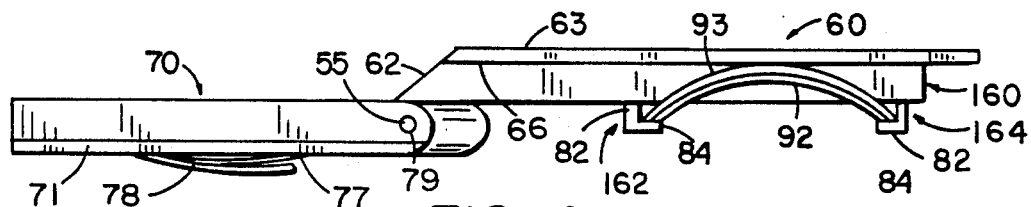
FIG. 4 is a front elevational view of the structure shown in FIG. 3.

As best seen in FIGS. 3 and 4, slide member 60 includes an upper platform 63 which includes a pair of rectangular slots 64 and 65 formed therein. Extending downwardly and centrally along platform 63 is a rib 160 (FIGS. 5 and 7) which fits within a slot 42 of support member 40 and slides therealong to guide the movement of slide member with respect to support 40. The outer edges of platform 63 ride over the upper surface 41 of member 40 as best seen in FIGS. 6 and 7. Member 160 includes a pair of downwardly extending T-shaped support members 162 and 164 which are positioned below and near opposite ends of the rectangular slots 64 and 65 formed in the platform 63. The members 162 and 164 define spring holding cradles while slots 64 and 65 provide clearance for the spring and cover arms as described below prior to installation of the slide assemblies 50 and 80 to the support 40 and visor panel 30.

Figure 5:
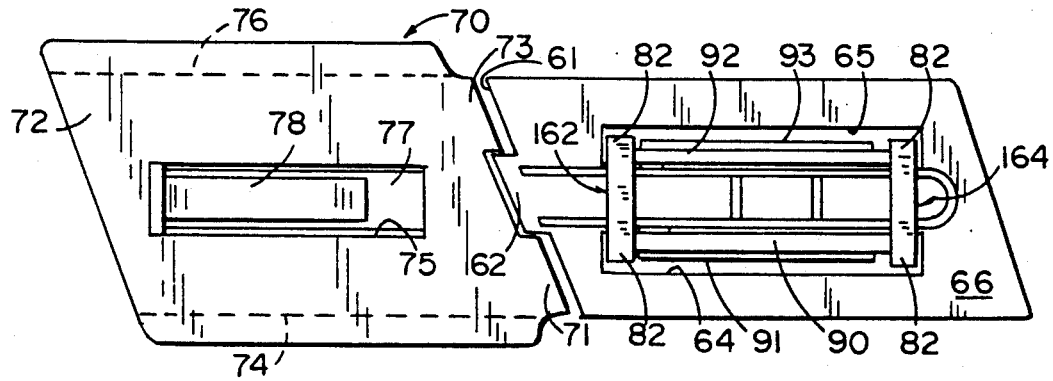
FIG. 5 is a bottom plan view of the slide assembly shown in FIG. 3.
Figure 6:
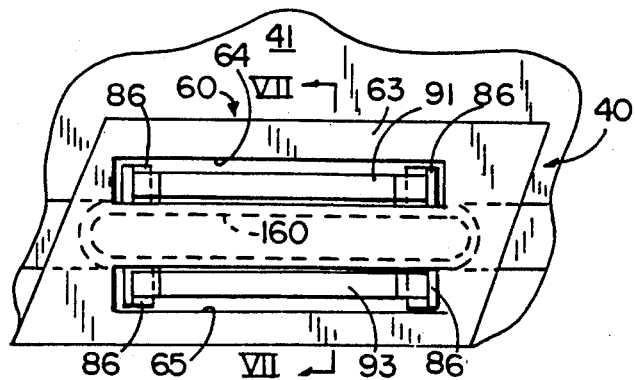
FIG. 6 is a fragmentary top plan view of a portion of the slide assembly shown in FIGS. 2 and 3 shown installed in the vehicle support.
Figure 7:
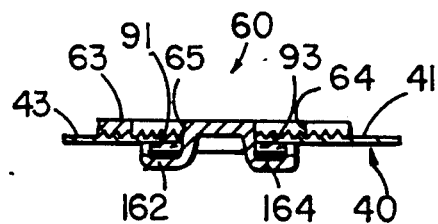
FIG. 7 is a cross-sectional view of the structure shown in FIG. 6 taken along section lines VII—VII of FIG. 6.

As seen in FIGS. 3-8, each of the T-shaped members 162 and 164 are integrally formed with the downwardly extending guide rib 160 and include a cross member 82 which extends downwardly and is spaced from the lower surface 66 of member 63 as best seen in FIG. 5. Cross members 82 each terminate at opposite ends in cradle forming inwardly projecting ledges 84 as best seen in FIG. 4 for supporting opposite ends of a pair of bent leaf springs 90 and 92 made of steel. Each of the springs are supported at opposite ends by the horizontally extending ledges 84 which terminate in upwardly formed L-shaped shoulders 86 as seen in FIGS. 3 and 6 to captively hold the ends of springs 90 and 92 in a position underlying platform 63 as best seen in FIG. 4.

Figure 8:
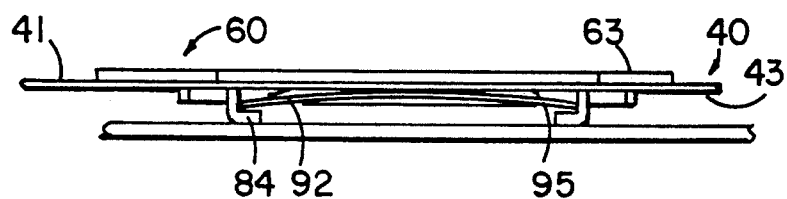
FIG. 8 is a front elevational view of the structure shown in FIG. 6.
Figure 9:
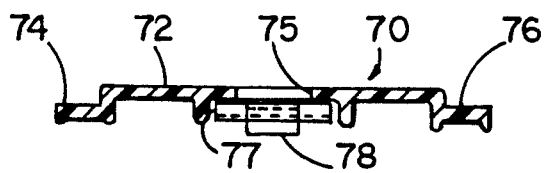
FIG. 9 is an enlarged cross-sectional view taken along section lines IX—IX of FIG. 3.

Integrally extending from rib 160 is a pair of cantilevered polymeric spring arms 91 and 93 which overly at least a major portion of the upper surface of springs 90 and 92 respectively. Each of the arms 91 and 93 includes a free end 95 and an opposite end 97 integrally attached to rib 160 by a laterally extending web 98 (FIG. 3) of material from which the integral slide member 60 is molded. Springs 90 and 92 thus are covered by the cantilevered resilient polymeric arms 91 and 93 which engage the lower surface 43 of support member 40 as best seen in FIG. 8.

Slide member 60 is inserted within the open end 45 of slot 42 in the support member 40 typically prior to installation of the headliner in the vehicle. Upwardly extending U-shaped tangs 46 at the forward edge 47 of support member 40 assure clearance for slide member 60. Once installed, a finger at the forward edge 47 of the support member 40 immediately adjacent the slot 42 is upwardly bent to prevent slide member 60 from being withdrawn from the support member 40. When slide 60 is fully extended from slot 18 formed in the forward edge of headliner 16, hinge pin 55 extends outwardly from the headliner permitting pivoting of the visor panel 30 to a selected use position. The leaf springs 90 and 92 provide sufficient upwardly bias force for the cantilevered polymeric arms 91 and 93 against the lower surface 43 of plate 40 to compressibly hold the slide member 60 to member 40 with the lower surface 66 engaging upper surface 41 of support member 40 as best seen in FIG. 8. Member 60 and member 70 next described, are integrally molded of a suitable polymeric material such as acetal (CELCON) while springs 90, 92 are made of a spring steel. Support member 40 may be welded to the vehicle roof or, in some installations, attached to the upper inner surface of the molded headliner so as to be installed in connection with the installation of the headliner itself.

Pivotally coupled to slide member 60 is slide member 70 which includes a central body portion 72 with a pair of outwardly extending flanges 74 and 76 extending along opposite edges thereof. Flanges 74 and 76 are slidably and captively held generally within the guide means 100 of panel 30. Guide means 100, as best seen in FIG. 2, include a pair of parallel L-shaped guide ribs 114 and 116 which are integrally formed on the upper surface 31 of panel 30 near opposite edges thereof. The slide members 70 are captively but slidably held between ribs 114 and 116 by means of a slotted cover 120 with edges 121 and 123 which fit under and are secured to the L-shaped ribs. Cover 120 includes a large slot 122 extending toward the upper edge 34 of panel 30 to allow the central rectangular body 72 to slide therein. In order to provide controlled sliding motion with a constant feel, slide 70 also includes a bias spring construction.

A single curved leaf-type curved steel bias spring 73 extends within a rectangular recess under a rectangular slot 75 in member 70 and urges against the top surface of an integral polymeric cantilevered finger 78 (FIG. 4) extending from the forward edge of slot 75 rearwardly to substantially cover the spring 77. The underside of arm 78 is thus urged by spring 77 against the central surface area 115 between ribs 114 and 116 to provide a predetermined sliding friction between slide member 70 and panel 30. Thus, the top surface of flanges 74 and 76 engage the under surface of cover 120 while the lower surface of cantilevered arm 78 engage the surface 115 of panel 30 between each of the guide ribs for providing the predetermined sliding friction between the two members. The contact between each of the slide assemblies 50 and 80 and visor panel 30 and support member 40 is controlled by metallic leaf springs but ones which engage cantilevered fingers such that the interface is between a lubricious polymeric material and either the panel 30 or member 40 to prevent sticking and provide smooth acting sliding motion of the visor panel. Panel 30 can also be made of a suitable polymeric material.

As the visor panel 30 is withdrawn from the headliner to a use position, as illustrated in FIG. 1, slide 60 slides within track 42 and slide 70 slides out of the slot 122 to provide a double acting slide for maximum extension of visor panel 30. Each of the slides 70 are mounted within the guide means formed on panel 30. The end of the cover 120 adjacent the upper edge 34 of panel 30 can be closed to define a stop preventing withdrawal of slide member 70 from the panel 30 at its extreme extended position. The planes of slide member 70 and slide member 60 are offset as best seen in FIG. 4 such that the panel 30 slides under support member 40 and overlies support member 40 fully when the visor is in a retracted position. Due to the double acting slide, i.e. slide member 60 sliding in slot 42 and slide member 70 sliding along panel 30, the panel 30 can fully retract over the support member 40 when in a retracted position thereby providing compact storage of the panel in a minimum space and yet allow full extension of the panel during use.

By combining a double acting slide with the visor pivot control provided by the spring roll pin hinge mechanism, an improved slide-out visor construction of compact dimensions is provided. By additionally including a steel bias spring overlaid by a polymeric contact arm, rattling of the sliding mechanism in the vehicle is prevented while maintaining a smooth sliding action for both portions of the slide assembly over a wide range of operating temperatures, humidities and conditions encountered in the automotive environment.

In some embodiments, it may be desirable to provide a supplemental torque control for relatively large visor panels. In such case, a supplemental torque control device between support member 40 and visor panel 30 can be provided. Such a member may, for example, include a U-shaped rod captively held with a spring-loaded socket at the forward edge 47 of member 40 to provide a predetermined frictional rotation therebetween. Ends of the U-shaped rod are allowed to slide along the upper surface 31 of visor 30. Also, in order for the panel 30 to be withdrawn adjacent the inclined A-pillar of the vehicle, guide slots 42 and 122 may be inclined such that as the visor defined by panel 30 is withdrawn from the storage position, instead of traveling straight downwardly, it moves toward the A-pillar. It will become apparent to those skilled in the art that these and other modifications to the preferred embodiment as described herein can be made without departing from the spirit or scope of the invention as defined by the appended claims.

I claim:

1. A slide-out visor assembly for a vehicle including a double acting slide assembly, said visor assembly comprising;
   support means adapted to be mounted to a vehicle behind the headliner and adjacent a window and including guide means formed therein;
   a visor panel comprising a generally planar body including guide means; and
   a slide assembly coupling said visor panel to said support member, said slide assembly including a pair of slides and means for pivotally coupling said slides to one another with a first of said slides being slidably mounted to said guide means of said support member and the second of said slides being slidably coupled to said guide means of said visor panel.

2. The apparatus as defined in claim 1 wherein at least one of said slides includes bias means providing a bias force between said at least one slide and its associated guide means in a direction orthogonal to the sliding motion of said at least one slide within said associated guide means.

3. The apparatus as defined in claim 2 wherein each of said slides includes bias means for providing a force orthogonal to the sliding motion of said slides.

4. The apparatus a defined in claim 3 wherein each of said bias means comprises a leaf spring.

5. The apparatus as defined in claim 4 wherein each of said slides includes means for captively receiving said leaf springs and further include a polymeric covering for said springs which extends between said springs and the associated support member and visor panel.

6. The apparatus as defined in claim 5 wherein each of said slides are integrally molded of a polymeric material and wherein said polymeric covering comprises arm means extending over said springs.

7. The apparatus as defined in claim 6 wherein said means for pivotally coupling said slides includes hinge means including a hinge pin.

8. The apparatus as defined in claim 7 wherein said hinge pin comprises a roll pin for providing a predetermined torque between said slides.

9. The apparatus as defined in claim 8 wherein a first one of said slides includes a platform and support means extending downwardly therefrom for supporting a spring thereunder.

10. The apparatus as defined in claim 9 wherein said support means define cradle means for supporting opposite ends of a pair of spaced leaf springs.

11. The apparatus as defined in claim 11 wherein said first one of said slides includes a pair of apertures extending through said platform and aligned over said springs.

12. The apparatus as defined in claim 11 wherein said arm means of said first one of said slides comprises a pair of arms each extending from an edge of one of said apertures over one of said leaf springs.

13. The apparatus as defined in claim 12 wherein a second one of said slides includes a pair of flanges extending from opposite edges thereof.

14. The apparatus as defined in claim 13 wherein said slides are trapezoidal.

15. A visor assembly for a vehicle comprising:
   a planar support member for mounting behind the headliner of a vehicle adjacent a vehicle window, said support member including at least one guide slot extending in a direction toward and away from the window when mounted to the vehicle;
   a visor defined by a panel comprising a generally planar body including at least one cover member defining a guide slot formed therein and extending generally parallel to the minor axis of said panel;
   a first slide member slidably mounted within said guide slot of said support member; and
   a second slide member slidably mounted within said guide slot on said visor panel such that said panel can be slidably moved between stored position behind the vehicle headliner and a use position withdrawn from behind the headliner.

16. The apparatus as defined in claim 15 and further including means for pivotally coupling said first and second slide members to each other such that said panel can be tilted once in the use position.

17. The apparatus as defined in claim 16 wherein at least one of said slide members includes bias means providing a bias force between said at least one slide member and its associated guide slot in a direction orthogonal to the sliding motion of said at least one slide member within said associated guide slot.

18. The apparatus as defined in claim 17 wherein each of said slide members includes bias means for providing a force orthogonal to the sliding motion of said slide members.

19. The apparatus as defined in claim 18 wherein said bias means comprises a leaf spring.

20. The apparatus as defined in claim 19 wherein each of said slide members includes means for captively receiving said leaf springs and further include a polymeric covering for said leaf springs which extends between said springs and the associated support member and visor panel.

21. The apparatus as defined in claim 20 wherein said means for pivotally coupling said slide members includes hinge means including a hinge pin.

22. The apparatus as defined in claim 21 wherein said hinge pin comprises a roll pin for providing a predetermined torque between said slide members.

23. The apparatus as defined in claim 22 wherein said first slide member includes a platform and support means extending downwardly therefrom for supporting a spring thereunder.

24. The apparatus as defined in olaim 23 wherein said support means define cradle means for supporting opposite ends of a pair of spaced leaf springs.

25. The apparatus as defined in claim 24 wherein said first slide member includes a pair of apertures extending through said platform and aligned over said springs.

26. The apparatus as defined in claim 25 wherein said arm means of said first one of said slide member comprises a pair of arms each extending from an edge of one of said apertures over one of said leaf springs.

27. The apparatus as defined in claim 26 wherein said second slide member includes a pair of flanges extending from opposite edges thereof.

28. The apparatus as defined in claim 27 wherein each of said slide members are trapezoidal.

29. A slide-out visor assembly for a vehicle including a double acting slide assembly, said visor assembly comprising:
 a visor panel comprising a generally planar body including at least one cover member having a guide slot formed therein;
 a slide assembly including a pair of slides and means for pivotally coupling said slides to one another with one of said slides being slidably coupled to said guide slot on said visor panel; and
 means for slidably mounting the other of said slides to a vehicle such that said visor panel can be moved between a stored position behind the vehicle headliner and an extended use position.

30. The apparatus as defined in claim 29 wherein said means for pivotally coupling said slides includes hinge means including a hinge pin.

31. The apparatus as defined in olaim 30 wherein said hinge pin comprises a roll pin for providing a predetermined torque between said slides.

32. The apparatus as defined in claim 31 wherein said slides are integrally molded of a polymeric material and each include bias means extending between said slides and said visor panel and mounting means respectively.

33. The apparatus as defined in claim 32 wherein said bias means includes a steel leaf spring supported by said slides and covered by a polymeric arm extending from each of said slides.

* * * * *

UNITED STATES PATENT AND TRADEMARK OFFICE
CERTIFICATE OF CORRECTION

PATENT NO. : 5,186,442

DATED : February 16, 1993

INVENTOR(S) : Nels R. Smith

It is certified that error appears in the above-identified patent and that said Letters Patent is hereby corrected as shown below:

Column 3, line 59:

"overly" should be --overlay--.

Column 6, claim 11, line 31:

"claim 11" should be --claim 10--.

Column 7, claim 24, line 25:

"olaim" should be --claim--.

Column 8, claim 31, line 23:

"olaim" should be --claim--.

Signed and Sealed this

Twelfth Day of April, 1994

Attest:

BRUCE LEHMAN

Attesting Officer

Commissioner of Patents and Trademarks